Figure 1:
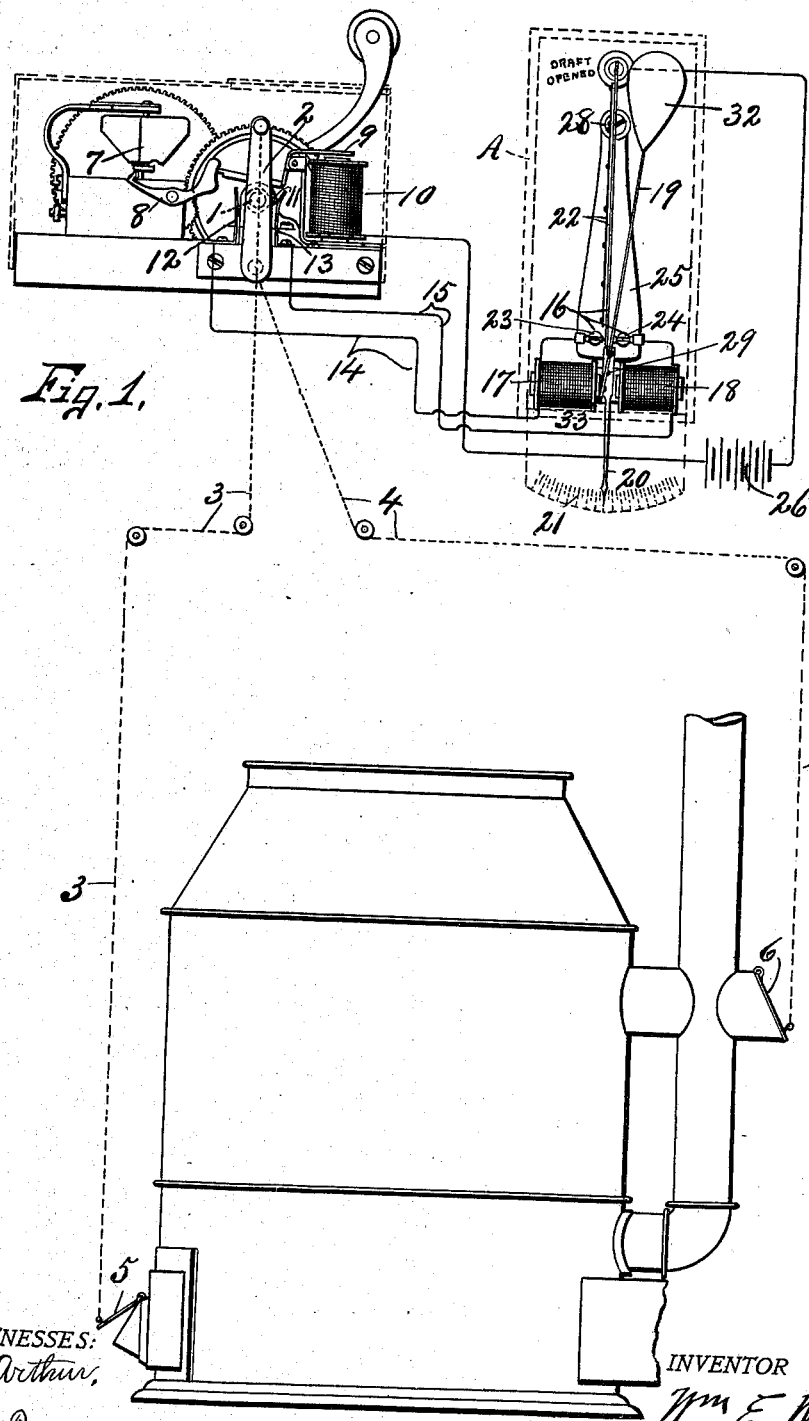

No. 738,557. PATENTED SEPT. 8, 1903.
W. E. MACK.
INDICATOR FOR THERMO-ELECTRIC REGULATORS FOR VALVES OR DAMPERS.
APPLICATION FILED OCT. 28, 1901.
NO MODEL. 3 SHEETS—SHEET 1.

WITNESSES:
F. E. Arthur
E. K. Benson

INVENTOR
Wm. E. Mack
BY Smith & Denison
ATTORNEYS.

No. 738,557. PATENTED SEPT. 8, 1903.
W. E. MACK.
INDICATOR FOR THERMO-ELECTRIC REGULATORS FOR VALVES OR DAMPERS.
APPLICATION FILED OCT. 28, 1901.
NO MODEL. 3 SHEETS—SHEET 2.
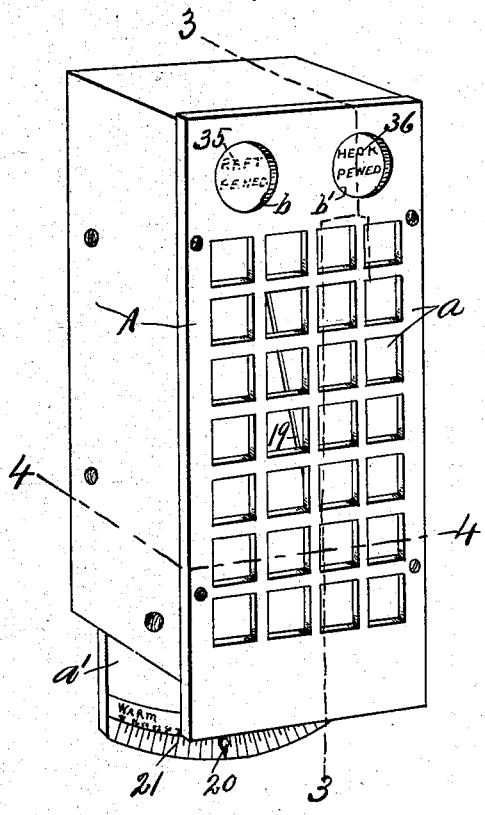
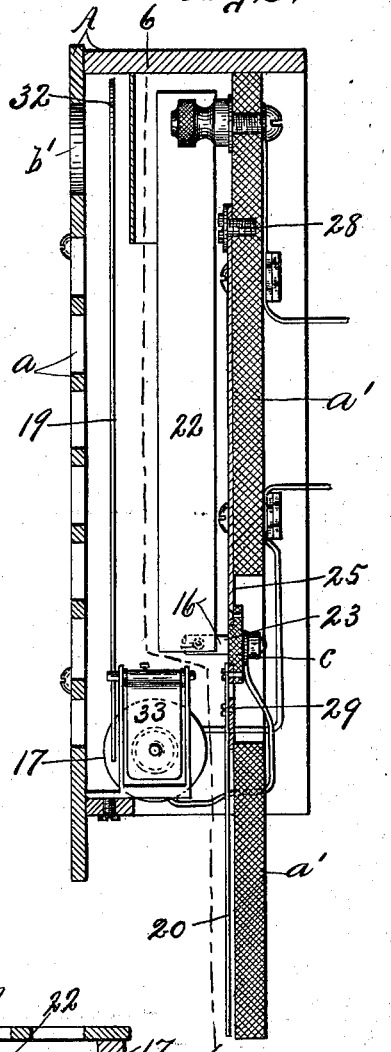
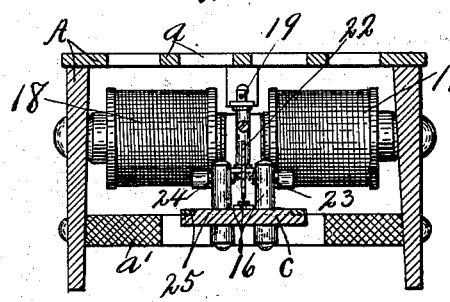
WITNESSES:
E. K. Benson
J. E. Arthur
INVENTOR
Wm E. Mack
BY Smith & Denison
ATTORNEYS.

No. 738,557. PATENTED SEPT. 8, 1903.
W. E. MACK.
INDICATOR FOR THERMO-ELECTRIC REGULATORS FOR VALVES OR DAMPERS.
APPLICATION FILED OCT. 28, 1901.
NO MODEL. 3 SHEETS—SHEET 3.
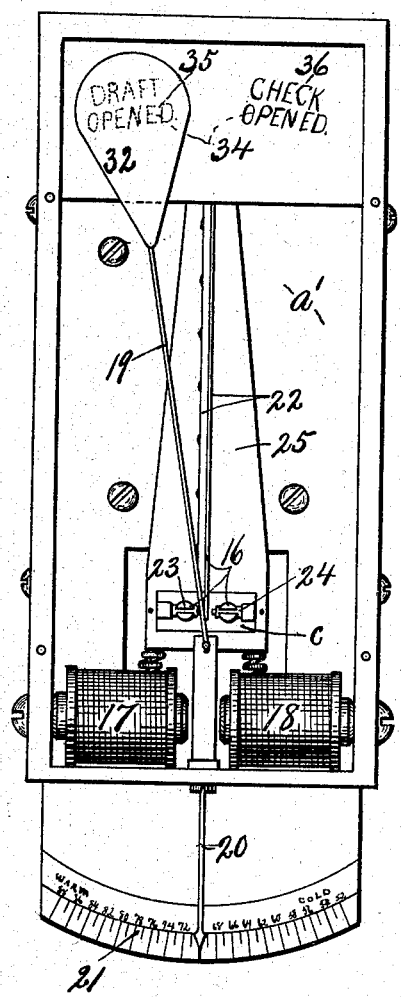
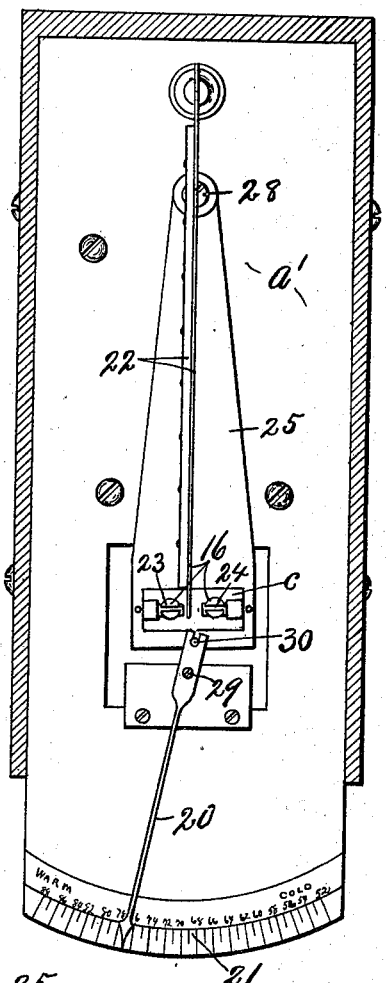
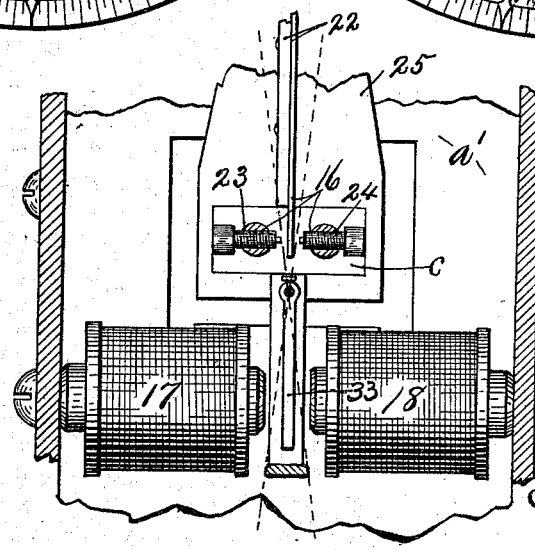
WITNESSES:
E. H. Brunson
J. E. Arthur
INVENTOR
Wm. E. Mack
Smith & Denison
ATTORNEYS.

No. 738,557. Patented September 8, 1903.

UNITED STATES PATENT OFFICE.

WILLIAM E. MACK, OF OSWEGO, NEW YORK.

INDICATOR FOR THERMO-ELECTRIC REGULATORS FOR VALVES OR DAMPERS.

SPECIFICATION forming part of Letters Patent No. 738,557, dated September 8, 1903.

Application filed October 28, 1901. Serial No. 80,275. (No model.)

*To all whom it may concern:*

Be it known that I, WILLIAM E. MACK, of Oswego, in the county of Oswego, in the State of New York, have invented new and useful Improvements in Indicators for Thermo-Electric Regulators for Valves or Dampers, of which the following, taken in connection with the accompanying drawings, is a full, clear, and exact description.

This invention relates to improvements in indicators for thermo-electric regulators for valves or dampers.

The object of this invention is to provide means connected in thermo-electric controlling-circuit for indicating the position of a damper or valve operated by the damper-regulating mechanism.

Another object is to provide manually-operative means for showing the position of the contact-terminals of the thermo-electric circuit which controls the temperature or valve-operating mechanism whereby the temperature of a room may be maintained automatically at any desired or predetermined degree.

To this end the invention consists in the combination, construction, and arrangement of the parts of an indicator for the purpose described, as hereinafter set forth.

Referring to the drawings, Figure 1 is a diagrammatic view showing a heater, a damper-operating device, a thermo-electric regulator for controlling said device, and portions of my improved indicator connected thereto, the inclosing cases of the damper-operating device and thermo-electric regulator being shown in dotted lines. Fig. 2 is an isometric view of my improved indicating device. Figs. 3 and 4 are sectional views taken, respectively, on lines 3 3 and 4 4 of Fig. 2. Fig. 5 is a front elevation of the device seen in Fig. 1, the front plate being removed for disclosing the interior parts. Fig. 6 is a sectional view taken on line 6 6 of Fig. 3, the shifting-finger for the contact-terminals being shown in different position from that seen in Fig. 5. Fig. 7 is an enlarged detail view showing a portion of a compound bar and contact-terminals of the electrothermostat and the controlling-magnets and armature of the movable shutter of the indicator.

Similar reference characters indicate corresponding parts in all the views.

In the drawings, Fig. 1, I have shown on a small scale a damper-operating device or motor similar to that set forth in my Patent No. 680,262, issued August 13, 1901, and consisting, essentially, of a motor-actuated shaft 1, having a crank-arm 2, provided with diametrically opposite pins or bearings which are connected by chains or cords 3 and 4 to suitable dampers, as a draft-damper 5 and a check-damper 6. The operation of this motor is controlled by a governor 7, a trip or detent 8, and an armature 9 of an electromagnet 10. The operation of this device being described in my former patent above referred to, it is thought unnecessary to further illustrate or describe the same, the essential feature being a motor-actuated shaft having a damper-operating member which is intermittently movable for alternately opening and closing the draft and check dampers of a heater, said intermittent movement being controlled by an armature of an electromagnet connected in circuit with a thermostatic circuit-closer whereby as the temperature rises and falls the controlling-circuit for the damper-operating mechanism is intermittently closed for alternately opening the draft and check dampers. The damper-operating mechanism is actuated by a suitable spring member, (not necessary to herein illustrate or describe,) being normally held from movement by the detent 8 until said detent is released by means of the armature 9 in the manner set forth in my former patent above referred to. The crank-arm 2 upon the driving-shaft 1 is preferably arranged in the form of a double-U-shaped member extending on opposite sides of the axis of the shaft 1, the draft cord or chain 3 being connected to the arm at one side of the shaft, and the cord or chain 4 is connected to said arm at the opposite side of the shaft for the purpose of alternately opening the draft-damper 5 and check-damper 6, said dampers being adapted to automatically close either by gravity or by a suitable spring, (not shown,) it being understood that when one of the dampers is open the other is closed. The driving-shaft 1 is electrically connected in the same circuit with the magnet 10 and is provided with a contact member 11, which is revoluble with the shaft and is adapted to alternately contact with suitable terminals 12 and 13, connected in independent circuits 14 and 15. The mechanism thus far described is substantially the same as that shown, described, and claimed in my former patent previously referred to, and it is believed that this description is sufficient to show the coaction of my invention therewith.

The essential features of my invention consist of a thermostatic circuit-closer 16, electromagnets 17 and 18, a movable member 19 for indicating the position of the dampers, and means, as an indicating-finger 20, movable relatively to fixed graduations 21, to show the position of the contact-terminals of the thermostatic circuit-closer relatively to the sensitive bar of the thermostat. As seen in the drawings, this consists, essentially, of a compound bar 22 and terminals 23 and 24, which are electrically connected, respectively, in the same circuits with the magnets 17 and 18. These terminals or contact members 23 and 24 are mounted upon an oscillatory member 25 in such relation to the compound bar 22 that the free metallic end of said compound bar projects between the adjacent ends of said contact-pieces, whereby the variation in temperature causes said free end of the compound bar to alternately contact with terminals 23 and 24 to close the circuits, respectively, through the magnets 17 and 18. The metal lamination of the compound bar being electrically connected to a source of electric energy, as a battery 26, the terminals 12 and 13, the contact member 11, and terminals 23 and 24 are so relatively arranged that when the contact member 11 is in contact with one of the terminals 12 or 13 of one of the circuits 14 15 and the bar 22 moves into contact with one of the terminals 23 or 24 of the same circuit the said circuit is closed through the magnet 10, thereby operating the armature 9 and detent 8 to release the damper-operating mechanism, whereupon the contact member 11 is immediately rotated into contact with the other terminal, which breaks the circuit through the magnet 10, thereby causing the motor to stop upon the half-revolution of the damper-operating member or arm 2. For example, assuming that the contact member 11 is in contact with the terminal 13, as shown in Fig. 1, which is electrically connected by wire 15 to the terminal 24, the damper-operating mechanism is now locked from movement by the detent 8 and the draft-damper 5 is held open, it being understood that the circuit through the magnet 10 is broken because the bar 22 is in contact with the terminal 23 and out of contact with the terminal 24. The draft-damper 5 is therefore held open until the temperature rises sufficient to move the bar 22 into engagement with the terminal 24, whereupon the circuit is instantly closed through the wire 15, terminal 13, contact 11, and magnet 10, thereby immediately energizing the magnet 10 to operate the detent 8 and release the damper-operating mechanism, which in turn rotates the arm 2 a half-revolution to close the damper 5 and open the check-damper 6. In like manner the check-damper 6 is closed and the draft-damper 5 again opened as the temperature rises and falls to affect the compound-bar 22. By these alternate operations of intermittently releasing the damper-operating mechanism as controlled by the thermostatic circuit-closer any desired temperature may be maintained in a room automatically, as it will be apparent that by moving the index-finger 20 along the graduations 21, thereby forcing one or the other of the terminals 23 or 24 into contact with the metallic lamination of the compound-bar 22, a greater or less degree of temperature may be required to move the metallic lamination into contact with the other terminal of the thermostatic circuit-closer. For example, suppose the device to be normally set for a temperature of 70° and it is desired to maintain a higher degree of temperature—as, for instance, 80°—the finger 20 would then be moved to the graduation 80 to force the terminal 23 into contact with the bar 22, thus separating the terminal 24 a greater distance from said contact-bar, and it is therefore evident that the contact member 11 will remain in contact with the terminal 13 to hold the draft-damper open until the temperature rises to 80° to move the bar 22 into contact with the terminal 24 for closing the circuit through the magnet 10 and whereby the operation is performed in the manner previously described. In like manner the temperature may be reduced by rocking the finger in the opposite direction to force the terminal 24 into contact with the bar 22 or into closer proximity to said contact-bar, whereby a greater degree of cold will be required to move the contact-bar into contact with the terminal 23. For the purpose of facilitating this movement of the terminals 23 and 24 the oscillatory member 25 is pivoted at 28 and the finger 20 is pivoted at its intermediate position at 29, one end being connected by a pin 30 to the adjacent end of the terminal support 25, and the opposite end of said finger 20 is movable along the graduations 21.

The means for indicating the position of the dampers 5 and 6, as seen in the drawings, consists of the electromagnet 17 and 18, the vibrating arm 19, carrying a shutter 32 and operated by an armature 33, and a suitable dial 34, mounted in the inclosing case, having representative characters "35" and "36," one of which, "35," indicates that the draft is open and the check closed, and the other, "36," indicates that the check is open and the draft closed. The shutter 32 is moved alternately by means of the armature 33 across the face of one or the other of the characters "35" or "36," according to which magnet 17 or 18 has been last energized. As seen in Fig. 1, the bar 22 is in contact with the terminal 23, having just closed the circuit through said magnet 17, terminal 12, and contact member 11 to close the circuit through the magnet 10, the contact member 11 being shown in this figure as just having moved out of contact with the terminal 12 and into contact with the terminal 13 to break the circuit through the magnet 17. This magnet 17 having been energized, as just described, moves the armature 33, and thus rocks the shutter 32 across the face of the character indicating the "Check open" and exposes the reading "Draft open" to indicate that the draft-door is open, as seen in Fig. 1. In like manner the shutter is moved across the face of the reading "Draft open," as seen in Fig. 5, to indicate that the check-damper is open and the draft-damper closed.

The indicator, thermostatic circuit-closer, and the temperature-regulating device forming the basis of my invention are mounted in a suitable case A, having a perforated front wall $a$ and a back wall $a'$, formed of insulating material, as rubber or fiber, the front wall being provided with sight-openings $b\ b'$, registered with the designating characters "35" and "36," and the back insulator-wall is arranged to receive and support the various electric terminals and connections. The shutter 32 and indicator-plate having the characters "35" and "36" are arranged in proximity to the front wall $a$, said shutter being movable between the apertures $b\ b'$ and the indicating-face of said plate. The terminals 23 and 24 are preferably mounted on an insulating-block $c$, secured to the free end of the oscillatory bar 25, in order to further prevent short circuits in the operation of the device.

The purpose of perforating the front plate is to permit a free circulation of air to and around the thermostat, said frame being open at its lower end for the same purpose and to permit the free movement of the finger 20.

The operation of my invention will now be readily understood upon reference to the foregoing description and the accompanying drawings, and it will be noted that although I have described specifically a particular damper-operating mechanism in connection with my invention—viz., a device for indicating the position of the dampers—it will be evident that this indicating mechanism may be used in connection with other thermo-electric valve or damper regulators and that other forms of thermostat and shutters or indicators may be employed in connection with electromagnets connected as described without departing from the spirit of my invention, the essential features being, first, to provide a thermostatic circuit-closer and electrically-operated means for indicating the position of the valves or dampers, and, second, to provide means for maintaining any predetermined temperature in the room in which my thermostatic circuit-closer may be located.

Having thus fully described my invention, what I claim as new, and desire to secure by Letters Patent, is—

1. The combination with the draft and check dampers of a heater and operating devices therefor, of two electric circuits for controlling the operation of said devices, each circuit including a contact-terminal and an electromagnet, a bar of electric-conducting material in said circuits and influenced by the variations in temperature to alternately contact with said terminals to close the circuits, means to move both terminals simultaneously whereby either may be brought closer to the bar than the other, a graduated scale representing different degrees of temperature, a pivoted indicator movable along the scale and connected to shift the terminals relatively to the bar, an armature common to both magnets and actuated by the one through which the circuit is closed, and movable means actuated by the armature for indicating the position of the dampers.

2. The combination with the draft and check dampers of a heater and operating devices therefor, of two electric circuits for controlling the operation of said devices, each circuit including a contact-terminal, an electromagnet and a conductor, the conductor being influenced by varying temperature to contact with one or the other of the terminals to close its circuit, an oscillatory member carrying the terminals, a graduated scale representing different degrees of temperature, an indicator movable along the scale and connected to oscillate said member to move either of the terminals closer to the bar than the other, an armature common to both electromagnets, an indicator-plate, and a shutter actuated by the armature across the face of said plate for the purpose described.

In witness whereof I have hereunto set my hand on this 14th day of October, 1901.

WILLIAM E. MACK.

Witnesses:
M. RENBOOK CONGDON,
W. H. LEWIS.